United States Patent
Nakata

(10) Patent No.: US 7,157,410 B2
(45) Date of Patent: Jan. 2, 2007

(54) PERFLUOROPOLYETHER ESTER COMPOUND, LUBRICANT AND MAGNETIC RECORDING MEDIUM

(75) Inventor: Yoshiaki Nakata, Tochigi (JP)

(73) Assignees: Sony Corporation, Tokyo (JP); Sony Chemical & Information Device Corporation, Tokyo (JP)

( * ) Notice: Subject to any disclaimer, the term of this patent is extended or adjusted under 35 U.S.C. 154(b) by 232 days.

(21) Appl. No.: 10/518,717

(22) PCT Filed: Oct. 16, 2003

(86) PCT No.: PCT/JP03/13246

§ 371 (c)(1),
(2), (4) Date: Dec. 22, 2004

(87) PCT Pub. No.: WO2004/035653

PCT Pub. Date: Apr. 29, 2004

(65) Prior Publication Data

US 2005/0209480 A1    Sep. 22, 2005

(30) Foreign Application Priority Data

Oct. 18, 2002  (JP) .............................. 2002-304173
Oct. 15, 2003  (JP) .............................. 2003-354600

(51) Int. Cl.
*C07C 69/66* (2006.01)

(52) U.S. Cl. ...................................... 508/455; 560/182
(58) Field of Classification Search ................. 508/455
See application file for complete search history.

(56) References Cited

U.S. PATENT DOCUMENTS 5,004,554 A    4/1991    Tohzuka et al.
5,431,833 A *  7/1995    Kondo et al. ............... 508/476

FOREIGN PATENT DOCUMENTS

| EP | 0 338 529 A2 | 10/1989 |
| JP | A-01-268664 | 10/1989 |
| JP | A-02-049218 | 2/1990 |
| JP | A-05-194970 | 8/1993 |

* cited by examiner

*Primary Examiner*—Paul A. Zucker
(74) *Attorney, Agent, or Firm*—Oliff & Berridge, PLC

(57) ABSTRACT

A novel perfluoropolyether derivative, which has at least one ester bond and is useful as a lubricant with a decomposition temperature of 300° C. or more, is obtained by an esterification reaction between a perfluoropolyether diol having hydroxyl groups at both ends thereof and represented by the formula (1) and a perfluoropolyether dicarboxylic acid having carboxyl groups at both ends thereof and represented by the formula (2):

$HOCH_2—R—CH_2OH$          (1)

$HOOC—R'—COOH$          (2)

wherein each of R and R' is a perfluoroether group.

8 Claims, 5 Drawing Sheets

PERFLUOROPOLYETHER ESTER COMPOUND, LUBRICANT AND MAGNETIC RECORDING MEDIUM

TECHNICAL FIELD

The present invention relates to a novel perfluoropolyether ester compound which is useful as a lubricant, and to a lubricant and recording medium employing same.

BACKGROUND ART

In hard disk devices for magnetic recording, because the magnetic head contacts the hard disk a lubricant is applied to the surface of the hard disk. Known lubricants of this kind include a perfluoropolyether diol having hydroxyl groups at both ends (Z-DOL, Ausimont), a perfluoropolyether dicarboxylic acid having carboxyl groups at both ends (Z-DIAC, Ausimont), and a perfluoropolyether tetraol having propylene glycol residues at both ends (Z-TETRAOL, Ausimont).

A perfluoropolyether ester derivative has also been proposed wherein a perfluoropolyether residue is bound to a long-chain alkyl group or perfluoroalkyl group via an ester bond (see Japanese Patent Application Laid-open No. H5-194970).

However, because it is expected that the next generation of compact hard disk devices for magnetic recording which allow high-density recording will be mounted in passenger vehicles, in which the indoor temperature is relatively high, they will need to be more heat-resistant, and in particular the lubricant applied to the outer surface of the hard disk will need to be heat-resistant at 300° C. or more.

In the case of the commercial lubricants described above (perfluoropolyether diol, perfluoropolyether dicarboxylic acid, perfluoropolyether tetraol), however, the problem is that the decomposition temperature is about 270° C. at most and the extinction temperature is about 450° C. at most, so the requirement of heat resistance at 300° C. or more is not met. Even in the case of the perfluoropolyether ester compound described in Japanese Patent Application Laid-open No. H5-194970, the decomposition temperature is no more than about 280° C. at most so the requirement of heat resistance at 300° C. or more is not met.

One possible way of improving the heat resistance of these perfluoropolyether derivatives which are lubricants would be to remove from the molecule the functional groups which are starting points for decomposition, but this is not a practical response considering the decrease in adhesion with the hard disk surface. The molecular weight of the perfluoropolyether derivative could also be increased by increasing the number of repeating units thereof, but this would be unlikely to yield a perfluoropolyether derivative with a narrow molecular weight distribution and stable characteristics.

It is an object of the present invention to resolve the aforementioned problems of background art and allow a novel perfluoropolyether derivative which is useful as a lubricant and exhibits a decomposition temperature of 300° C. or more to be provided in an industrially convenient way.

DISCLOSURE OF THE INVENTION

The inventors perfected the present invention when they discovered that a compound wherein at least two perfluoropolyether residues are bound by ester binding is a novel compound exhibiting a decomposition temperature of 300° C. or more.

That is, the present invention provides a novel perfluoropolyether ester compound having at least one ester bond, wherein the ester compound is obtained by an esterification reaction between a perfluoropolyether diol having hydroxyl groups at both ends thereof and represented by the formula (1) and a perfluoropolyether dicarboxylic acid having carboxyl groups at both ends thereof and represented by the formula (2):

$$HOCH_2-R-CH_2OH \quad (1)$$

$$HOOC-R'-COOH \quad (2)$$

wherein each of R and R' is a group selected independently from the following perfluoroether groups $R^1$ through $R^4$:

$R^1$: $-CF_2-(OCF_2CF_2)_m-(OCF_2)_n-OCF_2-$
$R^2$: $-(CF_2O)_j-(CF_2CF_2O)_k-(CF_2O)_l-CF_2-$
$R^3$: $-(CF_2CF_2CF_2O)_o-CF_2CF_2-$
$R^4$: $-(CF_2CF(CF_3)O)_p-CF_2-$ wherein m, n, j, k, l, o and p independently represent integers of 1 to 100.

Moreover, the present invention provides a lubricant containing this novel perfluoropolyether ester compound.

In addition, the present invention provides a magnetic recording medium having at least a magnetic layer formed on a non-magnetic support, wherein an applied film of lubricant containing the novel perfluoropolyether ester compound described above is formed on the surface of the magnetic layer.

BEST MODE FOR CARRYING OUT THE INVENTION

Figure 1:
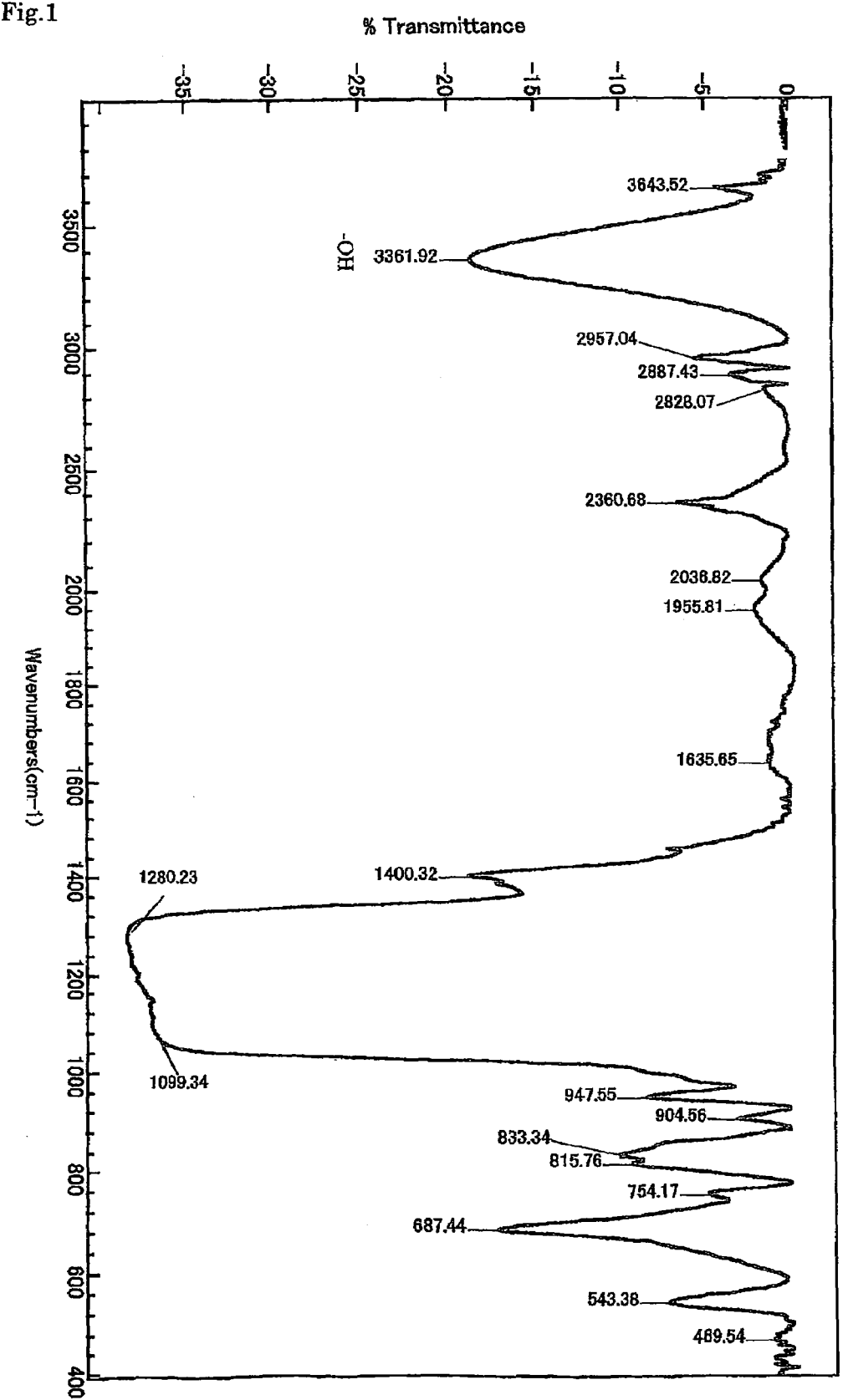
FIG. 1 is an IR chart of the perfluoropolyether diol of Formula (1) used in Example 1.

The present invention is explained in detail below.

The present invention is a novel perfluoropolyether ester compound having at least one ester bond and obtained by an esterification reaction between a perfluoropolyether diol having hydroxyl groups at both ends thereof and a perfluoropolyether dicarboxylic acid having carboxyl groups at both ends thereof.

The perfluoropolyether diol having hydroxyl groups at both ends is represented by the following Formula (1), while the perfluoropolyether dicarboxylic acid having carboxyl groups at both ends thereof is a compound represented by the following Formula (2):

$$HOCH_2-R-CH_2OH \quad (1)$$

$$HOOC-R'-COOH \quad (2)$$

(wherein each of R and R' is any substitutional group selected independently from the following perfluoroether groups $R^1$ through $R^4$:

$R^1$: $-(OCF_2)_n-OCF_2-$
$R^2$: $-(CF_2O)_j-(CF_2CF_2O)_k-(CF_2O)_l-CF_2-$ $R^3$: —$(CF_2CF_2CF_2O)_o$—$CF_2CF_2$—
$R^4$: —$(CF_2CF(CF_3)O)_p$—$CF_2$— wherein m, n, j, k, l, o and p independently represent integers of 1 to 100.

The novel perfluoropolyether ester compound of the present invention is not particularly limited as to the number of ester bonds, but from the standpoint of stability it should preferably have one or two ester bonds, and examples include those having the following chemical structure formulas (3) through (5) in which perfluoropolyether residues are bound to both sides of an ester bond.

$$HOCH_2—R—CH_2OOC—R'—COOH \quad (3)$$

$$HOCH_2—R—CH_2OOC—R'—COOCH_2—R—CH_2OH \quad (4)$$

$$HOOC—R'—COOCH_2—R—CH_2OOC—R'—COOH \quad (5)$$

Specific examples of the novel perfluoropolyether ester compound of the present invention include preferably compounds in which R is —$CF_2$—$(OC_2F_4)_{m1}$—$(OCF_2)_{n1}$—$OCF_2$— (wherein m1 and n1 are each independently numbers of 8 to 12) and R' is —$CF_2$—$(OC_2F_4)_{m2}$—$(OCF_2)_{n2}$—$OCF_2$— (wherein m2 and n2 are each independently numbers of 8 to 12) in chemical structure formulas (3), (4) and (5), as well as compounds in which R is —$CF_2$—$(OC_2F_4)_{m1}$—$(OCF_2)_{n1}$—$OCF_2$— (wherein m1 and n1 are each independently number of 8 to 12) and R' is —$CF_2$—$(OC_2F_4)_{m2}$—$(OCF_2)_{n2}$—$OCF_2$— (wherein m2 and n2 are each independently numbers of 19 to 24) in chemical structure formulas (3), (4) and (5).

Regarding the molecular weight of the novel perfluoropolyether ester compound of the present invention, if the weight average molecular weights of the perfluoropolyether diol of formula (1) and the perfluoropolyether dicarboxylic acid of formula (2) are too small the heat resistance temperature of the product will be less, while if they are to large reactivity will be less, so they are each preferably between 1500 and 4000 or more preferably between 1800 and 3800.

The perfluoropolyether ester compound of the present invention can be manufactured by heating and agitating the perfluoropolyether diol of formula (1) and the perfluoropolyether dicarboxylic acid of formula (2) in a solvent (such as PF5080 (Sumitomo 3M), FC77 (Sumitomo 3M) or Vertrel XF (Mitsui-Dupont Fluorochemical)) in the presence of an esterification catalyst such as p-toluenesulfonic acid or the like while removing the resulting water. Preferably it is manufactured by an industrially convenient bulk polymerization method which is esterification by heating and agitating the perfluoropolyether diol of formula (1) and the perfluoropolyether dicarboxylic acid of formula (2) without solvent at a temperature of 100 to 180° C. When it is manufactured by bulk polymerization it can be used as a lubricant without any industrial refinement operations such as recrystallization or the like.

The novel perfluoropolyether ester compound of the present invention explained above is useful as a highly heat-resistant lubricant with a decomposition temperature of 300° C. or more.

When the novel perfluoropolyether ester compound of the present invention is used as a lubricant the lubricant may be composed solely of the perfluoropolyether ester compound, or additives such as extreme pressure agents or rust-proofing agents can be added appropriately according to the intended use of the lubricant.

A lubricant containing the novel perfluoropolyether ester compound of the present invention can be used favorably for application to the surface of a magnetic recording medium. Consequently, a magnetic recording medium treated with a lubricant containing the novel perfluoropolyether ester compound of the present invention has a structure in which at least a magnetic layer is formed on a non-magnetic support, and an applied film of highly heat-resistant lubricant containing the novel perfluoropolyether ester compound of the present invention is formed on the surface of the magnetic layer. Thus, such as magnetic recording medium is particularly useful as the hard disk of a hard disk device for magnetic recording.

Configurations similar to those of the non-magnetic supports and magnetic layers which make up conventional known magnetic recording media can be adopted for the non-magnetic support and magnetic layer which make up the magnetic recording medium of the present invention.

EXAMPLES

The present invention is explained in detail below using examples.

Example 1

Figure 2:
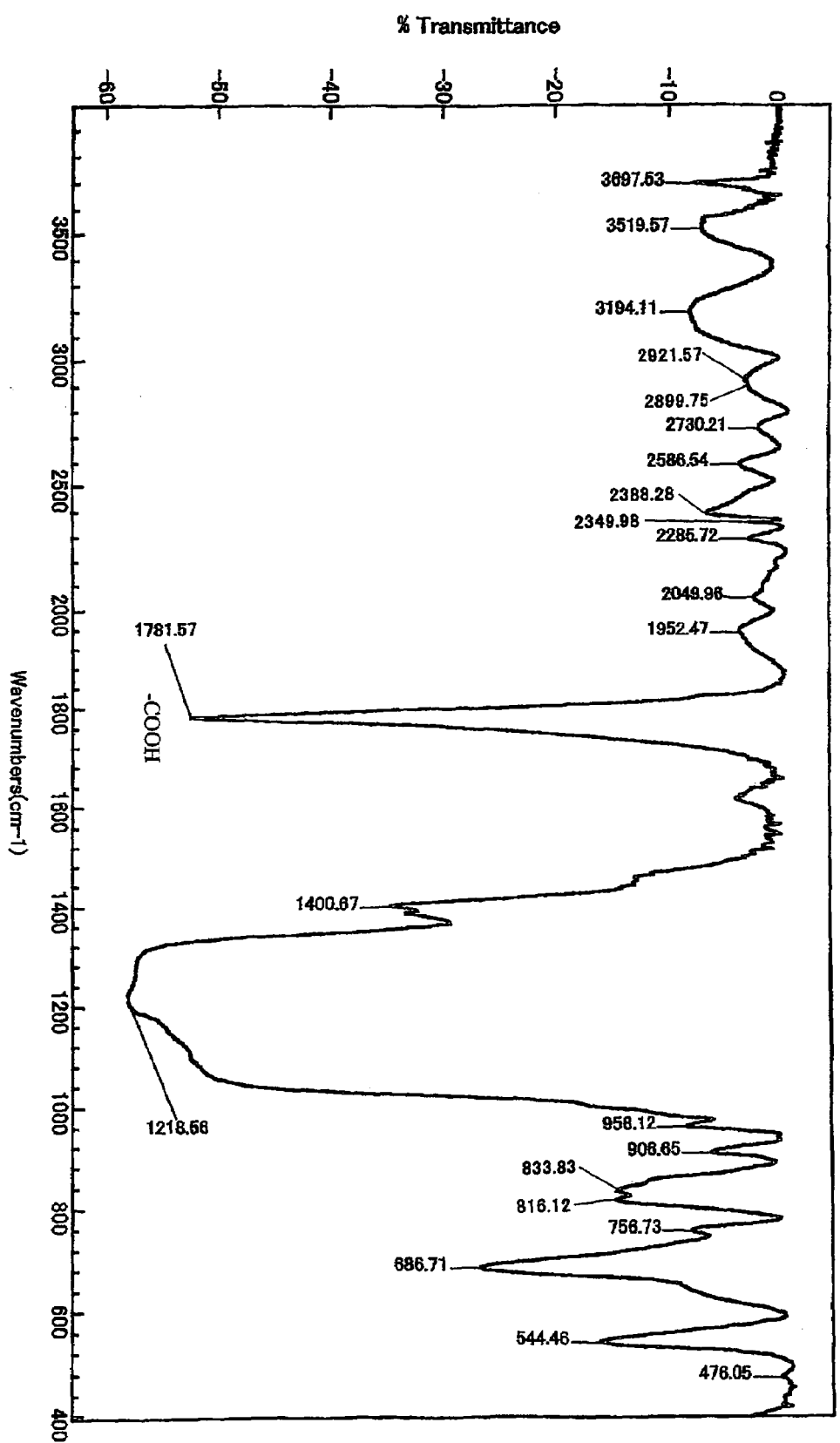
FIG. 2 is an IR chart of the perfluoropolyether dicarboxylic acid of Formula (2) used in Example 1.
Figure 3:
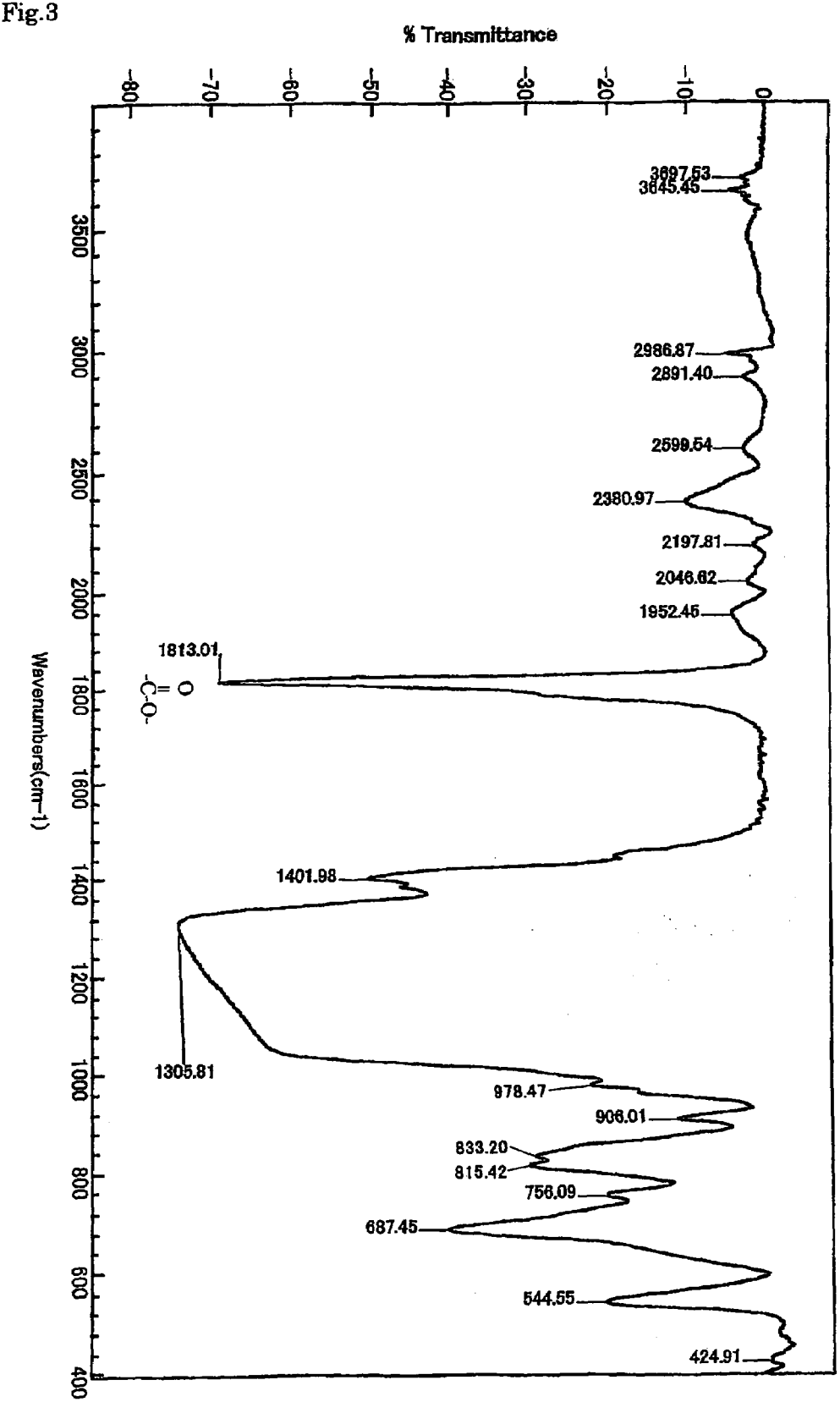
FIG. 3 is an IR chart of the perfluoropolyether ester compound obtained in Example 1.

20 parts by weight of the perfluoropolyether diol of formula (1) having the IR chart of FIG. 1 (weight average molecular weight=1900, R=—$CF_2$—$(OC_2F_4)_m$—$(OCF_2)_n$—$OCF_2$—, m=10, n=10, Ausimont) and 10 parts by weight of the perfluoropolyether dicarboxylic acid of formula (2) having the IR chart of FIG. 2 (weight average molecular weight=3800, R'=—$CF_2$—$(OC_2F_4)_m$—$(OCF_2)_n$—$OCF_2$—, m=20, n=20, Ausimont) were placed in a reaction vessel equipped with an agitator and reacted for 2 hours at 160° C. in a flow of nitrogen gas, to obtain a perfluoropolyether ester compound (weight average molecular weight 7800) corresponding to the aforementioned chemical structure formula (4) and having 2 ester bonds in the molecule. The exact structural formula of the resulting perfluoropolyether ester compound is as follows, and the IR chart thereof is shown in FIG. 3.

$HOCH_2$—{$CF_2$—$(OC_2F_4)_{m1}$—$(OCF_2)_{n1}$—$OCF_2$}—$CH_2OOC$—{$CF_2$—($OCF_2F_4)_{m2}$—$(OCF_2)_{n2}$—$OCF_2$}—$COO$—$CH_2$ {$CF_2$—$(OC_2F_4)_{m1}$—$(OCF_2)_{n1}$—$OCF_2$}—$CH_2OH$

Comparative Example 1

The perfluoropolyether dicarboxylic acid of formula (2) (Z-DIAC4000, Ausimont) was purified, and the polymer was fractioned to obtain a perfluoropolyether dicarboxylic acid compound with a weight average molecular weight of 7100 having no ester bonds in the molecule.

Example 2

Figure 4:
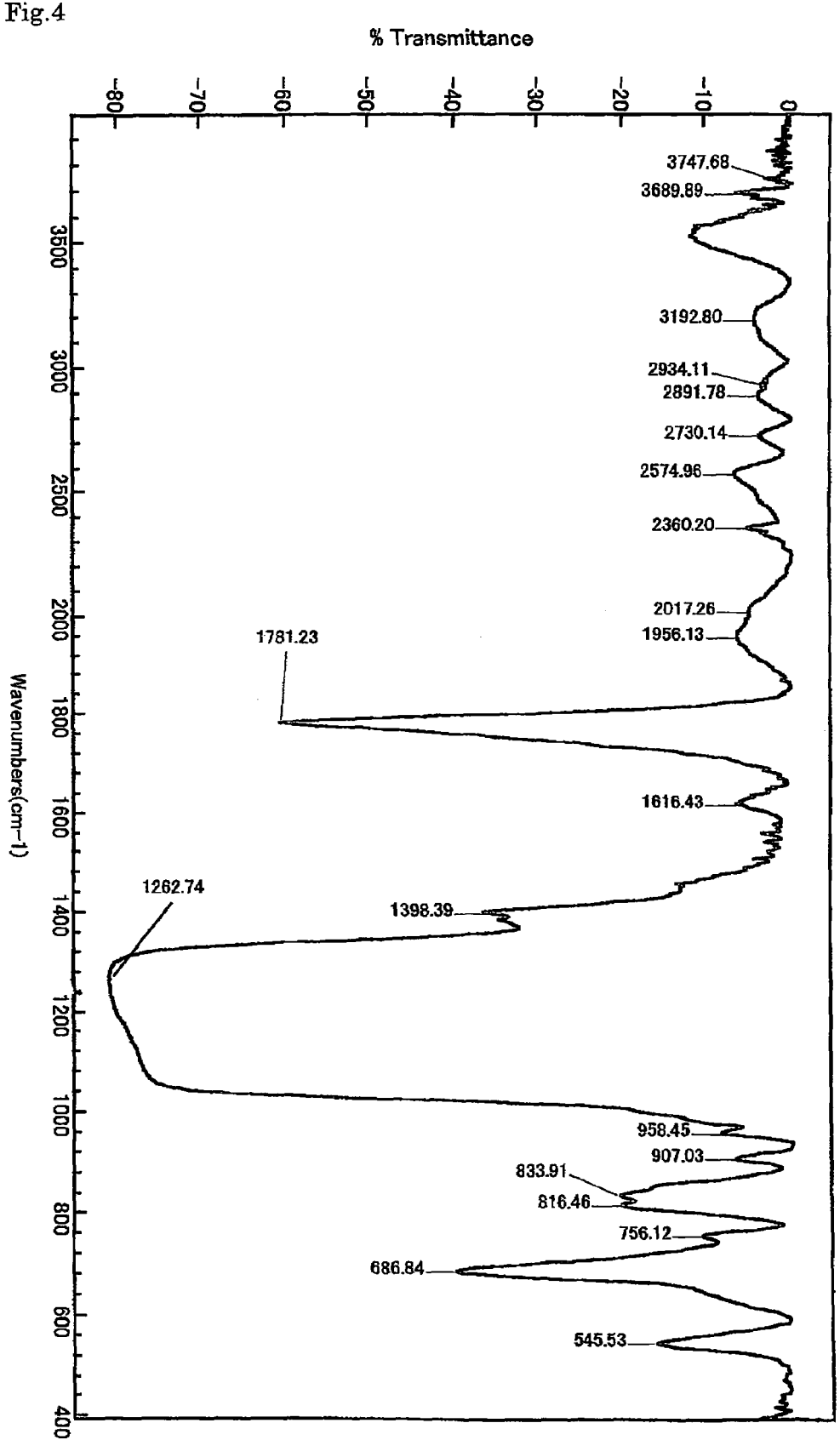
FIG. 4 is an IR chart of the perfluoropolyether dicarboxylic acid of Formula (2) used in Example 2.
Figure 5:
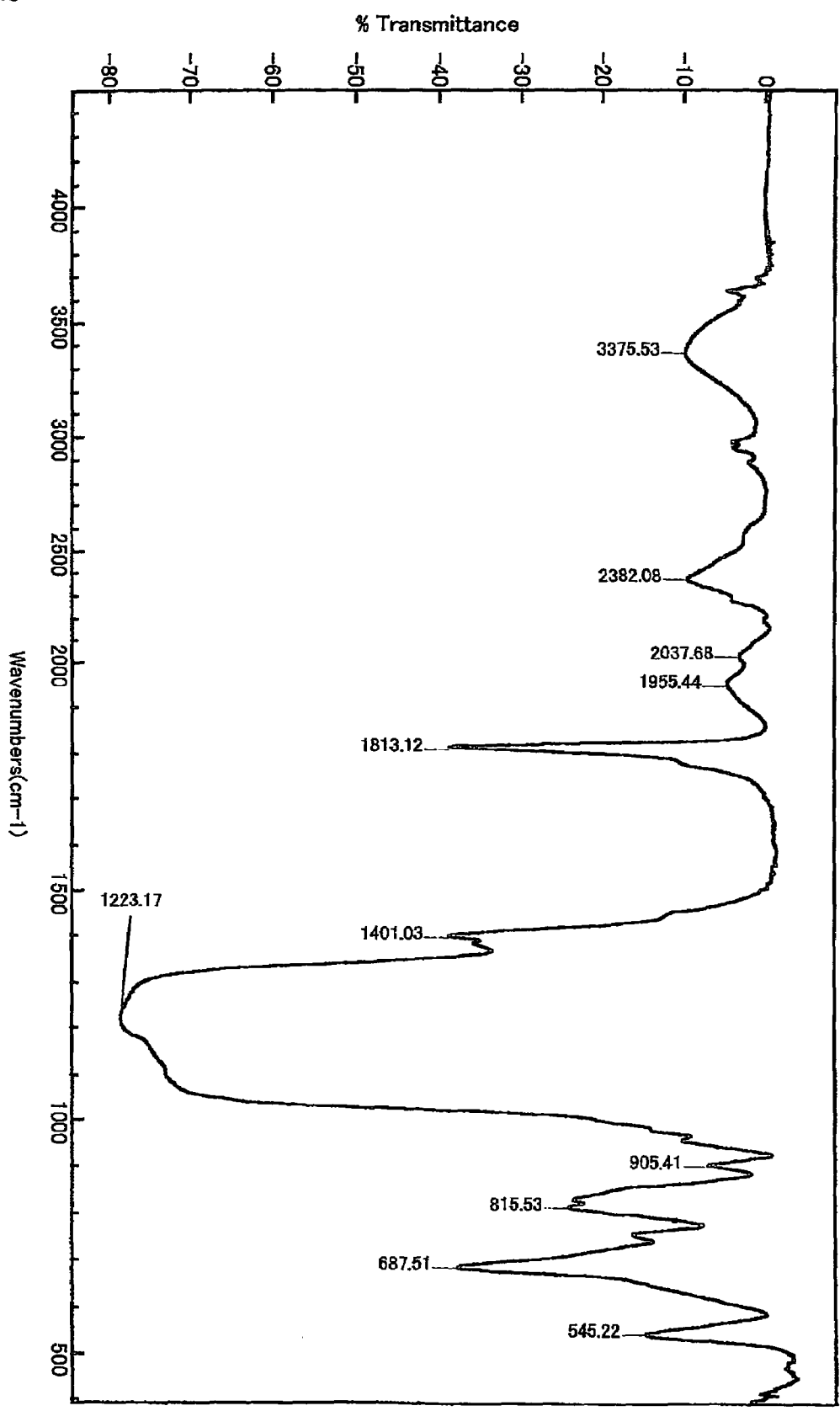
FIG. 5 is an IR chart of the perfluoropolyether ester compound obtained in Example 2.

10 parts by weight of the perfluoropolyether diol of formula (1) having effectively the same IR chart as the IR chart of FIG. 1 (weight average molecular weight=1800, R=—$CF_2$—$(OC_2F_4)_{m1}$—$(OCF_2)_{n1}$—$OCF_2$—, m1=10, n1=10, Ausimont) and 10 parts by weight of the perfluoropolyether dicarboxylic acid of formula (2) having the IR chart of FIG. 4 (weight average molecular weight=2000, R'=—$CF_2$—$(OC_2F_4)_{m2}$—$(OCF_2)_{n2}$—$OCF_2$—, m2=10, n2=10, Ausimont) were placed in a reaction vessel equipped with an agitator and reacted for 2 hours at 160° C. in a flow of nitrogen gas, to obtain the perfluoropolyether ester compound (weight average molecular weight 3800) of the aforementioned chemical structure formula (3) having 1 ester bond in the molecule. The exact structural formula of the resulting perfluoropolyether ester compound is as follows, and the IR chart thereof is shown in FIG. 5.

$HOCH_2$—{$CF_2$—$(OC_2F_4)_{m1}$—$(OCF_2)_{n1}$—$OCF_2$}—$CH_2OOC$—{$CF_2$—$(OCF_2F_4)_{m2}$—$(OCF_2)_{n2}$—$OCF_2$}—$COOH$

Comparative Example 2

The perfluoropolyether dicarboxylic acid of formula (2) having no ester bonds in the molecule (Z-DIAC4000, Ausimont) was used as is (weight average molecular weight 3800).

Comparative Example 3

Perfluorooctyl ethanol was reacted with the —COOH groups on both ends of the perfluoropolyether dicarboxylic acid (Z-DIAC4000, Ausimont) of formula (2) to obtain a perfluoropolyether fluoroalkyl diester compound having 2 ester bonds in the molecule (weight average molecular weight 4800).

(Evaluation)

The decomposition temperatures and extinction temperatures of the perfluoropolyether derivatives obtained in Examples 1 and 2 and Comparative Examples 1 through 3 were measured in accordance with JIS K0129. The results are shown in Table 1.

TABLE 1

| | Weight average molecular weight | Number of esters | Decomposition temperature | Extinction temperature |
|---|---|---|---|---|
| Example 1 | 7800 | 2 | 380° C. | 500° C. |
| Comparative Example 1 | 7100 | 0 | 330° C. | 450° C. |
| Example 2 | 3800 | 1 | 380° C. | 500° C. |
| Comparative Example 2 | 3800 | 0 | 270° C. | 450° C. |
| Comparative Example 3 | 4800 | 2 | 280° C. | 450° C. |

It can be seen from Table 1 that the perfluoropolyether ester compounds of Example 1 and Example 2, which have perfluoropolyether residues on both sides of an ester, both have higher decomposition temperatures than perfluoropolyether derivatives (Comparative Example 1 and Comparative Example 2) of roughly the same molecular weight which lack esters (380° C. for Example 1 vs. 330° C. for Comparative Example 1, 380° C. for Example 2 vs. 270° C. for Comparative Example 2).

From the results for Example 1 and Example 2 it can also be seen that the decomposition temperature is also less dependent on molecular weight when an ester is present (there is no great change in decomposition temperature depending on molecular weight). This finding differs completely from the finding based on Comparative Example 1 and Comparative Example 2 that the decomposition temperature rises as the molecular weight rises in the case of a perfluoropolyether derivative having no esters.

Consequently, it is seen that the decomposition temperature can be raised without increasing the weight average molecular weight if a perfluoropolyether ester compound is manufactured by introducing perfluoropolyether residues on both sides of an ester.

In the case of the perfluoropolyether derivative of Comparative Example 3 which has two ester bonds but which has a perfluoroalkyl group rather than a perfluoropolyether residue on one side of the esters, the decomposition temperature was low, only 280° C. From this it is seen that introduction of perfluoropolyether residues on both sides of an ester bond is effective for raising the decomposition temperature.

Moreover, the extinction temperature was 500° C. in the case of Examples 1 and 2 which had perfluoropolyether residues on both sides of the ester bonds, but 450° C. in the case of Comparative Examples 1 through 3. Consequently, it is seen that introduction of perfluoropolyether residues on both sides of an ester bond is effective for raising the extinction temperature.

INDUSTRIAL APPLICABILITY

The novel perfluoropolyether ester compound of the present invention is a compound having one or more ester bonds, which is obtained by performing an esterification reaction between a perfluoropolyether diol having hydroxyl groups at both ends thereof and a perfluoropolyether dicarboxylic acid having carboxyl groups at both ends thereof, and is therefor useful as a heat-resistant lubricant with a decomposition temperature of 300° C. or more.

The invention claimed is:

1. A perfluoropolyether ester compound having at least one ester bond, which is obtained by an esterification reaction between a perfluoropolyether diol having hydroxyl groups at both ends thereof and represented by the formula (1) and a perfluoropolyether dicarboxylic acid having carboxyl groups at both ends thereof and represented by the formula (2):

$$HOCH_2-R-CH_2OH \quad (1)$$

$$HOOC-R'-COOH \quad (2)$$

wherein each of R and R' is a group selected independently from the following perfluoroether groups $R^1$ through $R^4$:

$R^1$: —$CF_2$—$(OCF_2CF_2)_m$—$(OCF_2)_n$—$OCF_2$—
$R^2$: —$(CF_2O)_j$—$(CF_2CF_2O)_k$—$(CF_2O)_l$—$CF_2$—
$R^3$: —$(CF_2CF_2CF_2O)_o$—$CF_2CF_2$—
$R^4$: —$(CF_2CF(CF_3)O)_p$—$CF_2$— wherein m, n, j, k, l, o and p independently represent integers between 1 and 100.

2. The perfluoropolyether ester compound according to claim 1, wherein said esterification reaction is performed by the bulk polymerization method.

3. The perfluoropolyether ester compound according to claim 1, wherein the weight average molecular weights of the perfluoropolyether diol of formula (1) and the perfluoropolyether dicarboxylic acid of formula (2) are each between 2000 and 4000.

4. A lubricant containing the perfluoropolyether ester compound according to claim 1.

5. A magnetic recording medium having at least a magnetic layer formed on a non-magnetic support, wherein an applied film of the lubricant according to claim 4 is formed on the surface of the magnetic layer.

6. The perfluoropolyether ester compound according to claim 2, wherein the weight average molecular weights of the perfluoropolyether diol of formula (1) and the perfluoropolyether dicarboxylic acid of formula (2) are each between 2000 and 4000.

7. A lubricant containing the perfluoropolyether ester compound according to claim 2.

8. A lubricant containing the perfluoropolyether ester compound according to claim 3.

* * * * *